United States Patent
Yen et al.

(10) Patent No.: US 11,574,750 B2
(45) Date of Patent: *Feb. 7, 2023

(54) OVER-CURRENT PROTECTION DEVICE

(71) Applicant: Polytronics Technology Corp., Hsinchu (TW)

(72) Inventors: Hsiu Che Yen, Taoyuan (TW); Yung Hsien Chang, Douliu (TW); Zhen Yu Dong, Tainan (TW); Yao Te Chang, Yunlin County (TW); Fu Hua Chu, Taipei (TW)

(73) Assignee: POLYTRONICS TECHNOLOGY CORP., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/407,787

(22) Filed: Aug. 20, 2021

(65) Prior Publication Data
US 2022/0375658 A1 Nov. 24, 2022

(30) Foreign Application Priority Data
May 21, 2021 (TW) ................. 110118498

(51) Int. Cl.
*H01C 7/02* (2006.01)
*H01C 1/14* (2006.01)

(52) U.S. Cl.
CPC ............. *H01C 7/02* (2013.01); *H01C 1/1406* (2013.01)

(58) Field of Classification Search
CPC ................................. H01C 7/02; H01C 1/1406
See application file for complete search history.

(56) References Cited

U.S. PATENT DOCUMENTS

| | | | | |
|---|---|---|---|---|
| 6,104,587 A | * | 8/2000 | Banich | H01L 27/0248 361/58 |
| 9,349,510 B2 | * | 5/2016 | Lo | H01C 17/06586 |
| 9,997,906 B1 | * | 6/2018 | Yen | H01C 7/021 |
| 2012/0182118 A1 | * | 7/2012 | Tsai | H01C 7/13 264/488 |
| 2014/0205336 A1 | * | 7/2014 | Chu | H01C 7/041 219/541 |
| 2017/0018339 A1 | * | 1/2017 | Wang | H01C 7/027 |
| 2019/0096621 A1 | * | 3/2019 | Chen | C08L 23/16 |

* cited by examiner

*Primary Examiner* — Kyung S Lee
(74) *Attorney, Agent, or Firm* — Muncy, Geissler, Olds & Lowe, P.C.

(57) ABSTRACT

An over-current protection device comprises first and second electrode layers and a PTC material layer laminated therebetween. The PTC material layer comprises a polymer matrix, a conductive ceramic filler, a carbon-containing conductive filler, and an inner filler. The polymer matrix comprises a fluoropolymer having a melting point higher than 150° C. The inner filler is selected from one of aluminum nitride, silicon carbide, zirconium oxide, boron nitride, graphene, aluminum oxide, or any mixtures thereof, and comprises 2-10% by volume of the PTC material layer. The over-current protection device is able to mitigate negative temperature coefficient (NTC) behavior after trip of device, and achieves high hold current and high endurable power.

8 Claims, 2 Drawing Sheets

OVER-CURRENT PROTECTION DEVICE

BACKGROUND OF THE INVENTION

(1) Field of the Invention

The present application relates to an over-current protection device, and more specifically, to an over-current protection device mitigating negative temperature coefficient (NTC) behavior after trip of device.

(2) Description of the Related Art

Because the resistance of conductive composite materials having a positive temperature coefficient (PTC) characteristic is very sensitive to temperature variation, it can be used as the material for current sensing devices, and has been widely applied to over-current protection devices or circuit devices. The resistance of the PTC conductive composite material remains extremely low at normal temperatures, so that the circuit or cell can operate normally. However, when an over-current or an over-temperature event occurs in the circuit or cell, the resistance will instantaneously increase to a high resistance state (e.g. at least above $10^4 \Omega$), which is the so-called trip. Therefore, the over-current will be eliminated so as to protect the cell or the circuit device.

The over-current protection device includes a PTC material layer and two electrodes bonded to two opposite sides of the PTC material layer. The PTC material comprises a polymer matrix and a conductive filler uniformly dispersed in the polymer matrix. For high-temperature environment applications, the PTC material layer of the over-current protection device usually uses fluoropolymer as the polymer matrix. In the meanwhile, in order to have an over-current protection device having a low resistance, the conductive filler may use conductive ceramic power. Since hydrofluoric acid is generated when the conductive ceramic power is mixed with fluoropolymer at a high temperature, the PTC conductive composite material may further comprise magnesium hydroxide ($Mg(OH)_2$) which is added to avoid generation of hydrofluoric acid and to avoid influence on electrical characteristics of device. However, such a PTC conductive composite material including fluoropolymer, conductive ceramic power and magnesium hydroxide causes an issue that the over-current protection device has an NTC behavior after trip of device. In other words, after trip of device, the resistance of the device gradually decreases with gradual increase of temperature, such that the current flowing through the device may not be completely eliminated.

Electronic apparatuses are being made smaller as time goes on. Therefore, it is required to extremely restrict the sizes or thicknesses of active and passive devices. However, if the top-view area of the PTC material layer is decreased, the resistance of the device will be increased, and the voltage which the device can endure at most is lowered. Thus, the over-current protection device cannot withstand large current and high power. In addition, if the thickness of the PTC material layer is reduced, the voltage endurance of the device will be reduced at the same time. Apparently, the small-sized over-current protection devices are easily blown out in real applications.

Accordingly, there is a need to mitigate NTC behavior of the traditional over-current protection devices after trip of device. Also, it is necessary for the traditional device to be able to hold large currents and endure high power and have excellent voltage endurance, so as to provide applications thereof in high-temperature environments.

SUMMARY OF THE INVENTION

To solve aforementioned problems, the present invention provides an over-current protection device with a goal to mitigate NTC behavior after trip of device by introducing a fluoropolymer, a conductive ceramic filler, a carbon-containing conductive filler, and an inner filler. Moreover, the over-current protection device exhibits the features of high hold current per unit area, high endurable power per unit area, and high voltage endurance. In addition, although the size of the over-current protection device is reduced, resistivity thereof is not increased, thus being particularly suitable in applications for small-sized electronic products. Also, the over-current protection device of the present invention can withstand rigorous impacts in high-temperature environments.

In accordance with an aspect of the present application, the present application provides an over-current protection device comprising a first electrode layer, a second electrode layer, and a PTC material layer laminated between the first and second electrode layers. The PTC material layer has a resistivity less than 0.05 $\Omega \cdot cm$. The PTC material layer comprises a polymer matrix comprising at least one fluoropolymer with a melting point temperature higher than 150° C. and comprising 45-60% by volume of the PTC material layer. A conductive ceramic filler of a resistivity less than 500$\mu\Omega \cdot cm$ is dispersed in the polymer matrix and comprises 40-45% by volume of the PTC material layer. A carbon-containing conductive filler is dispersed in the polymer matrix and comprises 0.5-5% by volume of the PTC material layer. An inner filler is included in the PTC material layer and is selected from one of aluminum nitride, silicon carbide, zirconium oxide, boron nitride, graphene, aluminum oxide, or any mixtures thereof, and comprises 2-10% by volume of the PTC material layer. At 25° C., a hold current per unit area of the over-current protection device is 0.215-0.26 A/mm². At 25° C., an endurable power per unit area of the over-current protection device is 5.1-6.5 W/mm².

In an embodiment, a ratio of a resistance of the over-current protection device at 164° C. (R_164° C.) to a resistance of the over-current protection device at 200° C. (R_200° C.) is defined to be a resistance retention ratio $R_{o\%}$, and $R_{o\%}$ is between 2 and 10.

In an embodiment, the inner filler comprises boron nitride, and the resistance retention ratio $R_{o\%}$ is less than 5.

In an embodiment, the fluoropolymer is selected from the group consisting of polyvinylidene fluoride, poly(tetrafluoroethylene), poly(vinylidene fluoride), ethylene-tetrafluoro-ethylene, tetrafluoroethylene-hexafluoro-propylene copolymer, ethylene-tetrafluoroethylene copolymer, perfluoroalkoxy modified tetrafluoroethylenes, poly(chlorotrifluorotetrafluoroethylene), vinylidene fluoride-tetrafluoroethylene copolymer, tetrafluoroethylene-perfluorodioxole copolymer, vinylidene fluoride-hexafluoropropylene copolymer, and vinylidene fluoride-hexafluoropropylene-tetrafluoroethylene terpolymer.

In an embodiment, the conductive ceramic filler is selected from the group consisting of tungsten carbide, titanium carbide, vanadium carbide, zirconium carbide, niobium carbide, tantalum carbide, molybdenum carbide, hafnium carbide, titanium boride, vanadium boride, zirconium boride, niobium boride, molybdenum boride, hafnium boride and zirconium nitride.

In an embodiment, the over-current protection device passes a cycle life test at 24V and 50 A by 100 cycles without blowout.

In an embodiment, the over-current protection device has a top-view area of 20-35 mm² and a thickness of 0.3-0.7 mm.

In an embodiment, the over-current protection device after trip once has a resistivity (ρ_R1 max) of 0.026~0.033 Ω·cm.

The over-current protection device of the present invention uses at least one fluoropolymer to provide applications in high-temperature environments. By using specific polymer matrix, conductive ceramic filler, carbon-containing conductive filler, and inner filler, NTC behavior after trip of device is mitigated. Moreover, the over-current protection device exhibits the features of high hold current per unit area, high endurable power per unit area, and high voltage endurance (≥24V). The size of the over-current protection device is reduced, but resistivity od device is not increased, thus being particularly suitable in applications for small-sized electronic products.

BRIEF DESCRIPTION OF THE DRAWINGS

The present application will be described according to the appended drawings in which.

DETAILED DESCRIPTION OF THE INVENTION

Figure 1:
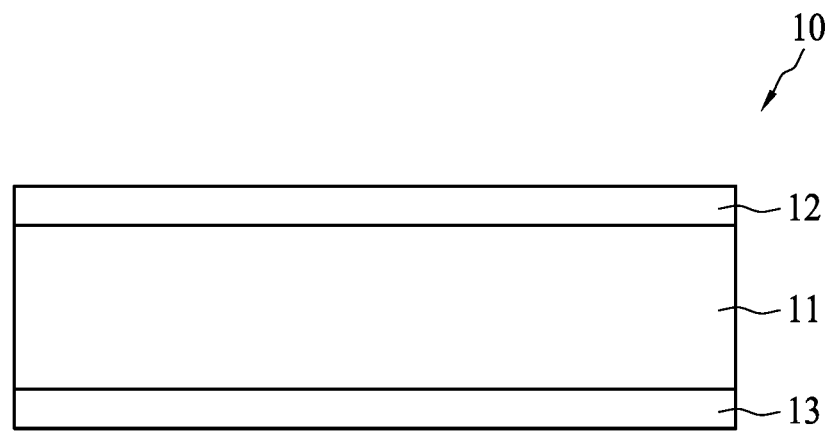
FIG. 1 shows an over-current protection device in accordance with an embodiment of the present invention.

The making and using of the presently preferred illustrative embodiments are discussed in detail below. It should be appreciated, however, that the present application provides many applicable inventive concepts that can be embodied in a wide variety of specific contexts. The specific illustrative embodiments discussed are merely illustrative of specific ways to make and use the invention, and do not limit the scope of the invention.

Table 1 shows the composition to form a PTC material layer by volume percentages in accordance with Embodiments (E1-E8) of the present application and Comparative Examples (C1-C2). In a polymer matrix, polyvinylidene fluoride (PVDF) uses Kynar® 761 A having a melting point temperature of 165° C. and comprising 40-50% by volume of the PTC material layer, and polytetrafluoroethene (PTFE) uses Zonyl™ PTFE MP1000 having a melting point temperature of 315° C. and comprising 5.5% by volume of the PTC material layer. The conductive filler used by all of E1-E8 and C1-C2 in the PTC material layer includes tungsten carbide (WC) and carbon black (CB). The tungsten carbide (WC) is included to lower resistance of the device, and thus it should have a higher volume percentage in the PTC material layer and comprises 40-45% by volume of the PTC material layer. To increase voltage endurance and electrical characteristic stability of the device, the PTC material layer in E1-E8 and C1-C2 may further include a small amount of carbon black (CB) which comprises 4% by volume of the PTC material layer. In addition to tungsten carbide (WC) and carbon black (CB), the PTC material layer in E1-E6 further includes an inner filler. Specifically, the PTC material layer in E1-E6 additionally includes aluminum nitride (AlN), silicon carbide (SiC), zirconium oxide (ZrO₂), boron nitride (BN), graphene and aluminum oxide (Al₂O₃) which comprises 2.5%, 2.5%, 2.5%, 2.5%, 4.5% and 2.5% by volume of the PTC material layer, respectively. In comparison with E4, E7 and E8, which comprise 5.6% and 8.6% by volume of the PTC material layer respectively, include more boron nitride (BN) in amount. C1 uses magnesium hydroxide (Mg(OH)₂) as inner filler which is usually used in traditional over-current protection device, and it comprises 2.5% by volume of the PTC material layer. The conductive fillers used in C2 include tungsten carbide (WC) and carbon black (CB) only without any inner filler. In other words, in this experimental test, tungsten carbide (WC) and carbon black (CB) are configured to serve as conductive filler, and other conductive filler or non-conductive filler are defined as inner filler. Taking C1 as an example, the inner filler used therein is magnesium hydroxide (Mg(OH)₂) which is usually used in traditional over-current protection device as a flame retardant.

TABLE 1

| | (volume percentage, vol %) | | | | | | | | | | |
|---|---|---|---|---|---|---|---|---|---|---|---|
| | PVDF | PTFE | Mg(OH)₂ | AlN | SiC | ZrO₂ | BN | graphene | Al₂O₃ | CB | WC |
| E1 | 48 | 5.5 | | 2.5 | | | | | | 4 | 40 |
| E2 | 48 | 5.5 | | | 2.5 | | | | | 4 | 40 |
| E3 | 48 | 5.5 | | | | 2.5 | | | | 4 | 40 |
| E4 | 48 | 5.5 | | | | | 2.5 | | | 4 | 40 |
| E5 | 46 | 5.5 | | | | | | 4.5 | | 4 | 40 |
| E6 | 48 | 5.5 | | | | | | | 2.5 | 4 | 40 |
| E7 | 44.9 | 5.5 | | | | | 5.6 | | | 4 | 40 |
| E8 | 42.1 | 5.3 | | | | | 8.6 | | | 4 | 40 |
| C1 | 48 | 5.5 | 2.5 | | | | | | | 4 | 40 |
| C2 | 48 | 5.5 | | | | | | | | 4 | 42.5 |

Figure 2:
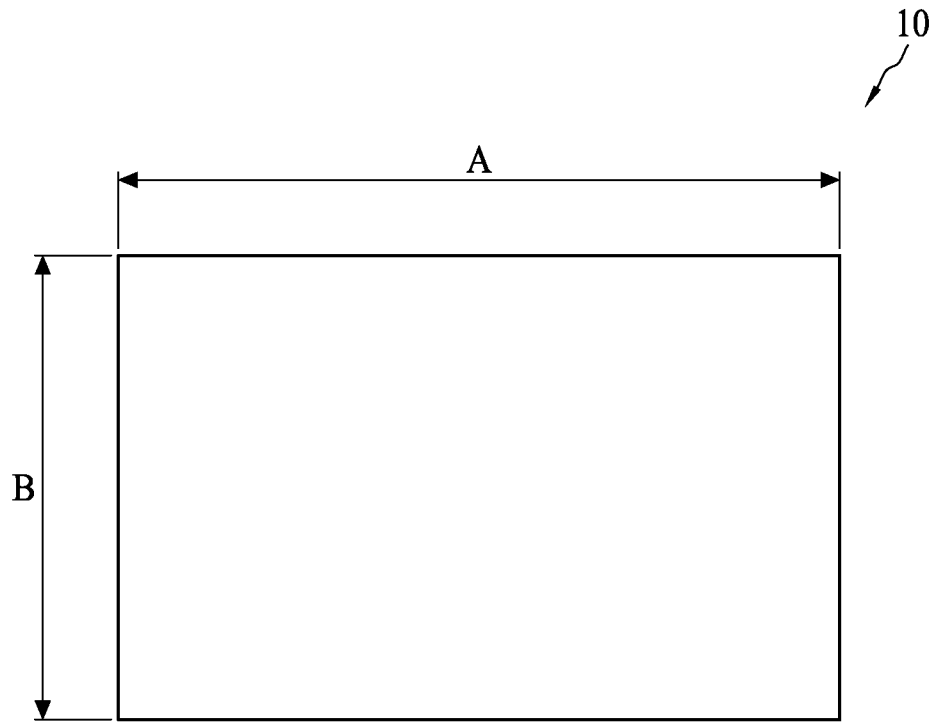
FIG. 2 shows the top view of the over-current protection device shown in FIG. 1.

The materials of E1-E8 and C1-C2 are put into HAAKE twin screw blender with the volume percentages as shown above for blending. The blending temperature is 215° C., the time for pre-mixing is 3 minutes, and the blending time is 15 minutes. The conductive polymer after being blended is pressed into a sheet by a hot press machine at a temperature of 210° C. and a pressure of 150 kg/cm². The sheet is then cut into pieces of about 20 cm×20 cm, and two nickel-plated copper foils are laminated to two sides of the sheet with the hot press machine at a temperature of 210° C. and a pressure of 150 kg/cm². Then, the sheet with the nickel-plated copper foils is punched into PTC chips. FIG. 1 shows one of the PTC chips which is an over-current protection device 10 of the present invention. FIG. 2 is a top view of the over-current protection device 10 shown in FIG. 1. The over-current protection device 10 comprises a PTC material layer 11 formed by the conductive polymer, and a first electrode layer 12 and a second electrode layer 13 formed by the nickel-plated copper foils. The top-view area "A×B" of the over-current protection device 10 is equivalent to the top-view area of the PTC material layer 11. All the over-current protection devices in E1-E8 and C1-C2 have a length "A" of 7 mm and a width "B" of 5 mm, and thus they all have a top-view area of 35 mm². The PTC material layer 11 is controlled during manufacturing process of the PTC chip to have a thickness of 0.7 mm.

In an embodiment, a solder paste is coated on the outer surfaces of the first and second electrode layers 12 and 13, and two copper electrodes with a thickness of 0.5 mm are respectively disposed on the solder paste on the first and second electrode layers 12 and 13 as external leads, and then the assembled device is subjected to a reflow soldering process at 300° C. so as to form a PTC device of an axial-type or a radial-leaded type. Alternatively, notches may be made on the first and second electrode layers by etching and followed by forming insulating layers, outer electrode layers and conductive connecting holes to form a PTC device of surface-mountable device (SMD) type.

Figure 3:
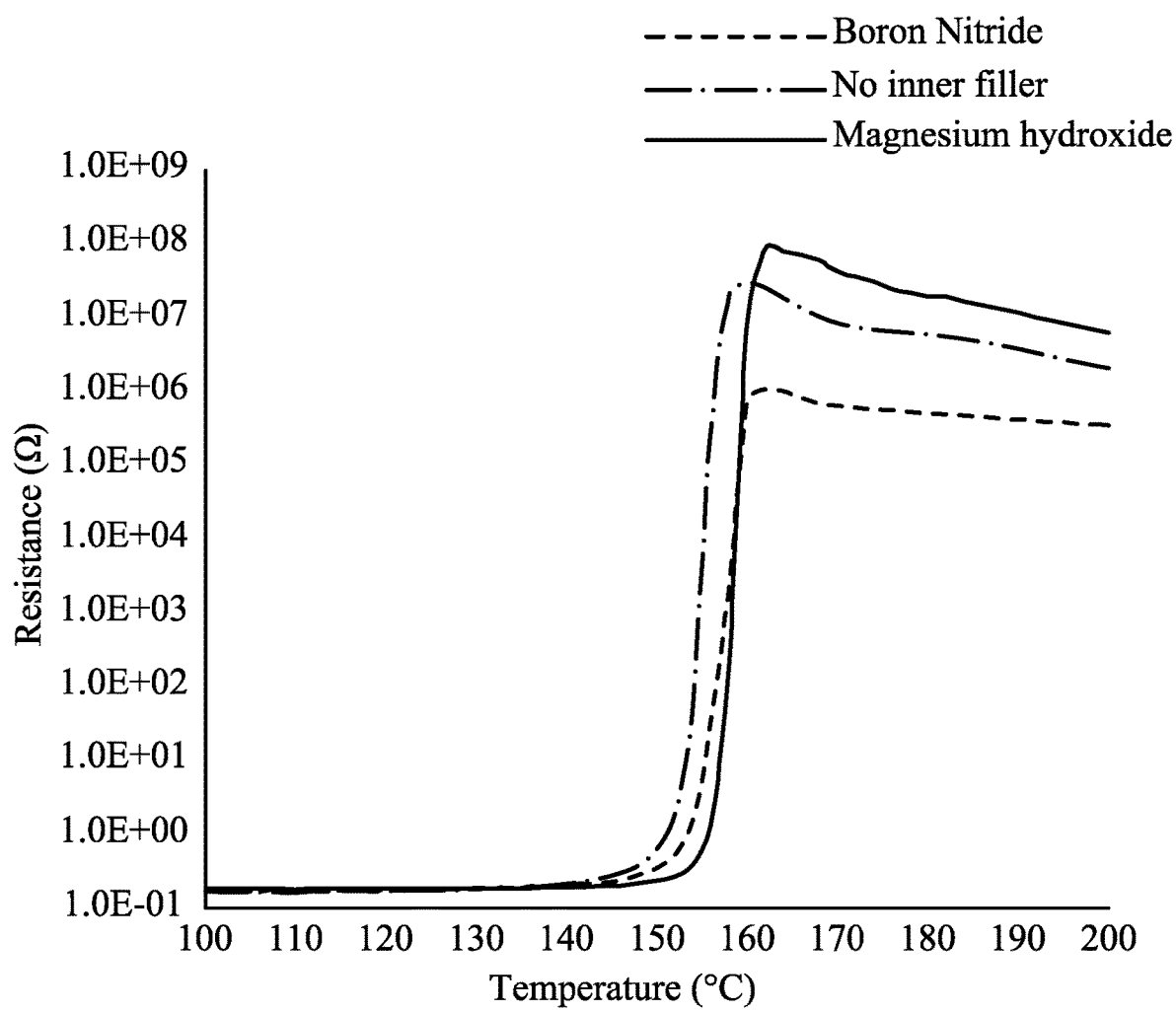
FIG. 3 shows the resistance-to-temperature (R-T) curves of three different over-current protection devices.

The PTC chips are subjected to electron beam irradiation of 50 kGy. The dose of irradiation can be adjusted as desired and is not a limitation to the present application. The following resistances of the PTC chips are measured after irradiation: (1) initial resistance, Ri; (2) the resistance after trip once, R1 max; (3) the resistance after heating at 164° C., R_164° C.; and (4) the resistance after heating at 200° C., R_200° C. Based on the four resistance values (R), and the thickness (L) and area (A) of the PTC material layer, corresponding resistivities $\rho$ and $\rho$_R1 max can be calculated in accordance with resistance formula R=$\rho$×L/A. These values are shown in Table 2. Moreover, a ratio of R_164° C./R_200° C. is calculated, and this ratio is defined to be a resistance retention ratio $R_{o\%}$. That is, $R_{o\%}$=R_164° C./R_200° C., which is used to evaluate resistance variation of device from 164° C. to 200° C. to realize the extent that resistance of device is lowered from 164° C. to 200° C. Please note that 164° C., the highest resistance of device after trip once, as shown in FIG. 3, is the temperature where magnesium hydroxide (Mg(OH)$_2$) is used as inner filler in the PTC material layer. Ideally, if the resistance retention ratio $R_{o\%}$ can be less than 1, there is no issue of NTC behavior after trip of device. On the other hand, if the resistance retention ratio $R_{o\%}$ is greater than 1, there is issue of NTC behavior after trip of device. Additionally, the greater the resistance retention ratio $R_{o\%}$ is, the more serious NTC behavior after trip of device will be.

In Table 2, E1-E8 use high volume percentage of tungsten carbide (WC) and appropriate volume percentage of carbon black (CB) to obtain resistivities less than 0.05 Ω·cm. Because E1-E8 further use aluminum nitride (AlN), silicon carbide (SiC), zirconium oxide (ZrO$_2$), boron nitride (BN), graphene and aluminum oxide (Al$_2$O$_3$), respectively, as inner filler, NTC behavior after trip of device is mitigated. To be more specific, it is shown that the resistance retention ratio ($R_{o\%}$=R_164° C./R_200° C.) in E1-E8 is between 2 and 10, which is smaller than that in C1-C2. In particular, the experimental test shows that boron nitride (BN) and graphene exhibit better performance in mitigating NTC behavior than other inner fillers; especially, boron nitride (BN) the better one in mitigating NTC behavior when compared with graphene, and is the best one in mitigating NTC behavior among all the inner fillers. In addition, for E4, E7 and E8 which all use boron nitride (BN) as inner filler, the test result shows that the more amount the boron nitride (BN) is included, the more excellently the NTC behavior after trip of device will be mitigated, and the smaller the resistance retention ratio $R_{o\%}$ will be. In E4, E7 and E8, the resistance retention ratio $R_{o\%}$ can be lowered to be less than 5, or even less than 4 or 3. C1 uses magnesium hydroxide (Mg(OH)$_2$) that is usually used in traditional over-current protection device as inner filler, NTC behavior after trip of device is seriously obvious. C2 uses tungsten carbide (WC) and carbon black (CB) as conductive filler only without including any inner filler, the over-current protection device also encounters the issue where the resistance of device gradually decreases after trip of device.

FIG. 3 shows resistance-to-temperature (R-T) curves of three different over-current protection devices. In FIG. 3, the three curves are the R-T curves for the three over-current protection devices which use magnesium hydroxide (Mg(OH)$_2$) and boron nitride (BN) as inner and do not include inner filler, respectively. The compositions of the PTC conductive composite materials for the three curves are those shown in C1, E4 and C2 of Table 1. FIG. 3 illustrates a graph in which the horizontal axis represents Celsius temperature (° C.), and the vertical axis represents resistance (Q) of device in logarithmic scale. Because all the polymers used by C1, E4 and C2 in the polymer matrix are fluoropolymer (e.g., PVDF or PTFE) having a melting point temperature higher than 150° C., the trip temperature of the over-current protection devices falls within the range of 150-160° C. For C1 which uses magnesium hydroxide (Mg(OH)$_2$) as inner filler and C2 which does not include inner filler, it is observed that there is an obvious NTC behavior after trip of device, and each of the R-T curves after trip of device has a negative slope that is steeper. In contrast, for E4 which uses boron nitride (BN) as inner filler, it is observed that NTC behavior after trip of device is mitigated,

TABLE 2

|  | Ri (Ω) | $\rho$ (Ω·cm) | R1 max (Ω) | $\rho$_R1 max (Ω·cm) | R_164° C. (Ω) | R_200° C. (Ω) | R_164° C./ R_200° C. |
|---|---|---|---|---|---|---|---|
| E1 | 0.00349 | 0.0175 | 0.00539 | 0.02695 | $2.37 \times 10^7$ | $2.54 \times 10^6$ | 9.338 |
| E2 | 0.00362 | 0.0181 | 0.00625 | 0.03125 | $1.65 \times 10^7$ | $2.28 \times 10^6$ | 7.251 |
| E3 | 0.00380 | 0.0190 | 0.00527 | 0.02635 | $1.69 \times 10^7$ | $2.32 \times 10^6$ | 7.296 |
| E4 | 0.00416 | 0.0208 | 0.00597 | 0.02985 | $1.79 \times 10^6$ | $3.87 \times 10^5$ | 4.631 |
| E5 | 0.00429 | 0.0215 | 0.00659 | 0.03295 | $7.97 \times 10^6$ | $2.10 \times 10^6$ | 3.794 |
| E6 | 0.00394 | 0.0197 | 0.00573 | 0.02865 | $1.66 \times 10^7$ | $2.23 \times 10^6$ | 7.444 |
| E7 | 0.00246 | 0.0123 | 0.00565 | 0.02825 | $1.14 \times 10^6$ | $3.34 \times 10^5$ | 3.410 |
| E8 | 0.00302 | 0.0151 | 0.00600 | 0.03025 | $1.03 \times 10^6$ | $3.58 \times 10^5$ | 2.879 |
| C1 | 0.00396 | 0.0198 | 0.00655 | 0.03275 | $8.20 \times 10^7$ | $6.40 \times 10^6$ | 12.813 |
| C2 | 0.00287 | 0.0144 | 0.00435 | 0.02175 | $1.86 \times 10^7$ | $1.69 \times 10^6$ | 11.028 | and the R-T curve after trip of device is much flatter. Although FIG. 3 shows that boron nitride (BN) is used as inner filler only (i.e., E4), other inner fillers such as aluminum nitride (AlN), silicon carbide (SiC), zirconium oxide ($ZrO_2$), graphene and aluminum oxide ($Al_2O_3$), these inner fillers can mitigate NTC behavior after trip of device as well.

According to the present invention, the inner filler is selected from one of aluminum nitride (AlN), silicon carbide (SiC), zirconium oxide ($ZrO_2$), boron nitride (BN), graphene, aluminum oxide ($Al_2O_3$), or any mixtures thereof, and comprises 2-10% (such as 4%, 6% or 8%) volume of the PTC material layer. All the inner fillers having a volume percentage falling within this numerical range can mitigate NTC behavior after trip of device.

From Table 2, it is also observed that even if the top-view area of the PTC material layer is decreased to 7 mm×5 mm=35 $mm^2$ and the thickness of the PTC material layer is reduced to 0.7 mm in E1-E8, the resistances of the over-current protection devices are not increased when compared to traditional devices having larger size. In addition, the over-current protection device after trip once has a resistivity (i.e., $\rho\_R1$ max) of 0.026~0.033 $\Omega$·cm, such as 0.028 $\Omega$·cm, 0.030 $\Omega$·cm or 0.032 $\Omega$·cm. In practice, according to the present invention, the over-current protection device can have a top-view area as small as 20-35 $mm^2$ (such as 25 $mm^2$ or 30 $mm^2$) and have a thickness of 0.3-0.7 mm (such as 0.4 mm, 0.5 mm or 0.6 mm), in which such small-sized over-current protection device do not have an increased resistivity.

The following measurements are performed by taking five PTC chips as samples for each of E1-E8 and C1-C2 having different compositions: (1) trip current (I-trip) at 25° C.; and (2) a cycle life test (on: 10 seconds; off: 60 seconds) at 24V and 50 A by 100 cycles. Each cycle comprises a process of trip and recovery. The trip current per unit area ($A/mm^2$) and endurable power per unit area ($W/mm^2$) can be calculated upon trip current value, the area of the device, and the operating voltage. The trip current per unit area ($A/mm^2$) is equivalent to the hold current per unit area ($A/mm^2$). Table 3 shows the test results of E1-E8 and C1-C2.

TABLE 3

| | I-trip@ 25° C. (A) | I-trip@25° C./ area ($A/mm^2$) | Cycle life test @24 V/50 A | Endurable power/ area ($W/mm^2$) |
|---|---|---|---|---|
| E1 | 8.9 | 0.254 | PASS | 6.10 |
| E2 | 8.95 | 0.256 | PASS | 6.14 |
| E3 | 8.15 | 0.233 | PASS | 5.59 |
| E4 | 8.25 | 0.236 | PASS | 5.66 |
| E5 | 8.68 | 0.248 | PASS | 5.95 |
| E6 | 8.4 | 0.240 | PASS | 5.76 |
| E7 | 8.06 | 0.230 | PASS | 5.53 |
| E8 | 7.52 | 0.215 | PASS | 5.16 |
| C1 | 8.11 | 0.232 | PASS | 5.56 |
| C2 | 9.5 | 0.271 | FAIL | 6.51 |

It is observed from Table 3 that owing to use of appropriate inner fillers for the over current devices of E1-E8, at 25° C., a hold current per unit area of the over-current protection device is 0.215-0.26 $A/mm^2$, and thus the over-current protection device passes the cycle life test of 100 cycles at 24V and 50 A without blowout. In addition, at 25° C., an endurable power per unit area of the over-current protection device is 5.1-6.5 $W/mm^2$. C1 has a hold current per unit area of the over-current protection device which is approximate to those in E1-E8, and can pass the cycle life test, and has a good endurable power per unit area of the over-current protection device. However, because, as said above, C1 uses magnesium hydroxide ($Mg(OH)_2$) as inner filler, C1 has the issue of obvious NTC behavior after trip of device. As to C2, because C2 does not include any inner filler, C2 fails in the cycle life test where the over-current protection device is blown out during the cycle life test.

In summary, the polymer matrix used in the PTC material layer of the over-current protection device of the present invention includes at least one fluoropolymer comprising 45-60% (e.g., 47%, 50%, 53%, 56% or 59%) by volume of the PTC material layer. The conductive ceramic filler could be tungsten carbide (WC), for example, and comprises 40-45% (e.g., 41%, 43% or 44%) by volume of the PTC material layer. The carbon-containing conductive filler could be carbon black (CB), for example, and comprises 0.5-5% (e.g., 1%, 2% or 4%) by volume of the PTC material layer. The inner filler is selected from one of aluminum nitride (AlN), silicon carbide (SiC), zirconium oxide ($ZrO_2$), boron nitride (BN), graphene, aluminum oxide ($Al_2O_3$), or any mixtures thereof, and comprises 2-10% (e.g., 4%, 6% or 8%) by volume of the PTC material layer. Accordingly, NTC behavior after trip of the over-current protection device can be mitigated. In particular, with such compositions, the resistance retention ratio $R_{o\%}$ is in the range of between 2 and 10. At 25° C., a hold current per unit area of the over-current protection device is 0.215-0.26 $A/mm^2$, such as 0.22 $A/mm^2$, 0.23 $A/mm^2$, 0.24 $A/mm^2$ or 0.25 $A/mm^2$. Also, the over-current protection device can pass the cycle life test at 24V and 50 A without blowout. The over-current protection device also exhibits the features of high voltage endurance, high hold current per unit area, and high endurable power per unit area. With the endurable voltage being increased to 24V, the endurable power per unit area increases to 5.1-6.5 $W/mm^2$, e.g., 5.5 $W/mm^2$ or 6 $W/mm^2$. Moreover, although the top-view area of the PTC material layer is decreased to 20-35 $mm^2$ (e.g., 25 $mm^2$ or 30 $mm^2$) and the thickness of the PTC material layer is reduced to 0.3-0.7 mm (e.g., 0.4 mm, 0.5 mm or 0.6 mm), the over-current protection device after trip once can have a resistivity ($\rho\_R1$ max) of 0.026~0.033 $\Omega$·cm, such as 0.028 $\Omega$·cm, 0.030 $\Omega$·cm or 0.032 $\Omega$·cm. According to the present invention, a small-sized over-current protection device with top-view area and thickness thereof reduced does not lead to a resistivity being increased.

The over-current protection device of the present invention is used for high-temperature environment applications. Therefore, it is required that the fluoropolymer has a melting point temperature higher than 150° C., and the fluoropolymer is not limited to PVDF. Alternatively, other fluoropolymers having melting point temperatures higher than 150° C. and similar features can be used also, such as polyvinylidene fluoride, ethylene-tetrafluoroethylene copolymer, tetrafluoroethylene-hexafluoro-propylene copolymer (FEP), ethylene-tetrafluoroethylene copolymer (PETFE), perfluoroalkoxy modified tetrafluoroethylenes (PFA), poly(chloro-tri-fluorotetrafluoroethylene) (PCTFE), vinylidene fluoride-tetrafluoroethylene copolymer (VF-2-TFE), poly(vinylidene fluoride), tetrafluoroethylene-perfluorodioxole copolymer, vinylidene fluoride-hexafluoropropylene copolymer, and vinylidene fluoride-hexafluoropropylene-tetrafluoroethylene terpolymer. Preferably, a plurality of fluoropolymers with different melting point temperatures could be used by which a smooth resistance-to-temperature curve (R-T curve) is obtained to enhance the stability of cycle life test and voltage endurance.

In addition to tungsten carbide (WC), the conductive ceramic filler of the PTC material layer may use other materials having a resistivity less than 500μ$\Omega$·cm, including but not limited to metal carbide, metal boride or metal nitride such as titanium carbide (TiC), vanadium carbide (VC), zirconium carbide (ZrC), niobium carbide (NbC), tantalum carbide (TaC), molybdenum carbide (MoC), hafnium carbide (HfC), titanium boride (TiB$_2$), vanadium boride (VB$_2$), zirconium boride (ZrB$_2$), niobium boride (NbB$_2$), molybdenum boride (MoB$_2$), hafnium boride (HfB$_2$) or zirconium nitride (ZrN).

The present invention provides an over-current protection device which can mitigate NTC behavior after trip of device. In addition, the over-current protection device exhibits the features of high voltage endurance, high hold current per unit area, and high endurable power per unit area, and therefore it can withstand rigorous impacts in high-temperature environments and is suitable for high-temperature over-current applications. Moreover, the size of the over-current protection device is reduced without increase of resistivity, thus being particularly suitable in applications for small-sized electronic products.

The above-described embodiments of the present invention are intended to be illustrative only. Numerous alternative embodiments may be devised by persons skilled in the art without departing from the scope of the following claims.

What is claimed is:

1. An over-current protection device, comprising:
   a first electrode layer;
   a second electrode layer; and
   a positive temperature coefficient (PTC) material layer laminated between the first and second electrode layers and having a resistivity less than 0.05 Ω·cm, the PTC material layer comprising:
   a polymer matrix comprising at least one fluoropolymer with a melting point temperature higher than 150° C., and comprising 45-60% by volume of the PTC material layer;
   a conductive ceramic filler of a resistivity less than 500p cm dispersed in the polymer matrix, and comprising 40-45% by volume of the PTC material layer;
   a carbon-containing conductive filler dispersed in the polymer matrix and comprising 0.5-5% by volume of the PTC material layer; and
   an inner filler selected from one of aluminum nitride, silicon carbide, zirconium oxide, boron nitride, graphene, aluminum oxide, or any mixtures thereof, and comprising 2-10% by volume of the PTC material layer;
   wherein at 25° C., a hold current per unit area of the over-current protection device is 0.215-0.26 A/mm$^2$;
   wherein at 25° C., an endurable power per unit area of the over-current protection device is 5.1-6.5 W/mm$^2$.

2. The over-current protection device of claim 1, wherein a ratio of a resistance of the over-current protection device at 164° C. (R_164° C.) to a resistance of the over-current protection device at 200° C. (R_200° C.) is defined to be a resistance retention ratio R$_{o\%}$, and R$_{o\%}$ is between 2 and 10.

3. The over-current protection device of claim 2, wherein the inner filler comprises boron nitride, and the resistance retention ratio R$_{o\%}$ is less than 5.

4. The over-current protection device of claim 1, wherein the fluoropolymer is selected from the group consisting of polyvinylidene fluoride, poly(tetrafluoroethylene), poly(vinylidene fluoride), ethylene-tetra-fluoro-ethylene, tetrafluoroethylene-hexafluoro-propylene copolymer, ethylene-tetrafluoroethylene copolymer, perfluoroalkoxy modified tetrafluoroethylenes, poly(chlorotri-fluorotetrafluoroethylene), vinylidene fluoride-tetrafluoroethylene copolymer, tetrafluoroethylene-perfluorodioxole copolymer, vinylidene fluoride-hexafluoropropylene copolymer, and vinylidene fluoride-hexafluoropropylene-tetrafluoroethylene terpolymer.

5. The over-current protection device of claim 1, wherein the conductive ceramic filler is selected from the group consisting of tungsten carbide, titanium carbide, vanadium carbide, zirconium carbide, niobium carbide, tantalum carbide, molybdenum carbide, hafnium carbide, titanium boride, vanadium boride, zirconium boride, niobium boride, molybdenum boride, hafnium boride and zirconium nitride.

6. The over-current protection device of claim 1, wherein the over-current protection device passes a cycle life test at 24V and 50 A by 100 cycles without blowout.

7. The over-current protection device of claim 1, wherein the over-current protection device has a top-view area of 20-35 mm$^2$ and a thickness of 0.3-0.7 mm.

8. The over-current protection device of claim 7, wherein the over-current protection device after trip once has a resistivity (ρ_R1 max) of 0.026~0.033 Ω·cm.

* * * * *